(12) United States Patent
Van Dijk

(10) Patent No.: US 11,955,702 B2
(45) Date of Patent: Apr. 9, 2024

(54) DETECTION LABEL

(71) Applicant: Nedap N.V., Groenlo (NL)

(72) Inventor: Jeroen Martin Van Dijk, Enschede (NL)

(73) Assignee: Nedap N.V., Groenlo (NL)

( * ) Notice: Subject to any disclaimer, the term of this patent is extended or adjusted under 35 U.S.C. 154(b) by 245 days.

(21) Appl. No.: 17/604,027

(22) PCT Filed: Apr. 16, 2020

(86) PCT No.: PCT/NL2020/050251
§ 371 (c)(1),
(2) Date: Oct. 15, 2021

(87) PCT Pub. No.: WO2020/214030
PCT Pub. Date: Oct. 22, 2020

(65) Prior Publication Data
US 2022/0142122 A1 May 12, 2022

(30) Foreign Application Priority Data
Apr. 17, 2019 (NL) ........................ 2022962

(51) Int. Cl.
*H01Q 1/27* (2006.01)
*G06K 19/07* (2006.01)
*G06Q 50/02* (2012.01)

(52) U.S. Cl.
CPC ......... *H01Q 1/273* (2013.01); *G06K 19/0723* (2013.01); *G06Q 50/02* (2013.01)

(58) Field of Classification Search
CPC .... H01Q 1/273; G06K 19/0723; G06Q 50/02; A01K 11/006
See application file for complete search history.

(56) References Cited

U.S. PATENT DOCUMENTS

2015/0302229 A1* 10/2015 Rosengren ......... G06K 7/10336
340/10.42

FOREIGN PATENT DOCUMENTS

WO  WO 2008/108816 A1  9/2008
WO  WO 2010/138994 A1  12/2010

OTHER PUBLICATIONS

European Patent Office, International Search Report in corresponding International Application No. PCT/NL2020/050251, dated Jul. 3, 2020 (2 pages).

* cited by examiner

*Primary Examiner* — Awat M Salih
(74) *Attorney, Agent, or Firm* — Leydig, Voit & Mayer, Ltd.

(57) ABSTRACT

The invention relates to a detection label provided with a passive resonant circuit which is configured to emit an identification code when the passive resonant circuit is introduced into a first electromagnetic interrogation field, wherein the label is further provided with a memory and an active circuit comprising a transmitter and a receiver, wherein the active circuit is configured to emit information which is stored in the memory with the transmitter when the active circuit is introduced into a second electromagnetic interrogation field comprising a first predetermined code, which second electromagnetic interrogation field is received with the receiver, characterized in that the label is configured, in response to the receiving of the second interrogation field, when the second interrogation field comprises a second predetermined code, to adjust a status of the label such that the passive resonant circuit does not emit the identification code when the passive resonant circuit is introduced into the first electromagnetic interrogation field.

12 Claims, 3 Drawing Sheets

DETECTION LABEL

CROSS-REFERENCE TO RELATED APPLICATIONS

This patent application is a U.S. National Phase of PCT International Application No. PCT/NL2020/050251, filed Apr. 16, 2020, which claims priority to Netherlands Application No. 2022962, filed Apr. 17, 2019, which are both expressly incorporated by reference in their entireties, including any references contained therein.

The present invention relates to a detection label provided with a passive resonant circuit which is configured to emit an identification code when the passive resonant circuit is introduced into a first electromagnetic interrogation field, wherein the label is further provided with a memory and an active circuit comprising a transmitter and a receiver, wherein the active circuit is configured to emit information which is stored in the memory with the transmitter when the active circuit is introduced into a second electromagnetic interrogation field comprising a first predetermined code, which second electromagnetic interrogation field is received with the receiver.

A detection label as described above is known for inter alia use in livestock farming, and more generally for other forms of livestock management. The detection label consists of an active part and a passive part, the passive part being used for recognition of the animal concerned. The active part constitutes, for example, a smart tag, a label with which different livestock management functions can be carried out, such as for example monitoring functions, recording functions, or control functions. Such a detection label makes far-reaching automation of livestock management possible.

Systems for the implementation and execution of different livestock management functions are preferably tailored to the needs of the livestock farm. Such systems are for instance available in different versions, or may be expanded later in a modular or other manner. However, it is not desired for the detection labels to require replacement when a system is updated, and neither is it desirable for the detection labels to be produced in different versions.

It is therefore an object of the present invention to solve the above problem and to provide a detection label which is compatible with different versions of a livestock management system, or which can be simply adjusted to the requirements of the system.

To this end, the invention, according to a first aspect thereof, provides a detection label provided with a passive resonant circuit which is configured to emit an identification code when the passive resonant circuit is introduced into a first electromagnetic interrogation field, wherein the label is further provided with a memory and an active circuit comprising a transmitter and a receiver, wherein the active circuit is configured to emit information which is stored in the memory with the transmitter when the active circuit is introduced into a second electromagnetic interrogation field comprising a first predetermined code, which second electromagnetic interrogation field is received with the receiver, characterized in that the label is configured, in response to receiving the second interrogation field, when the second interrogation field comprises a second predetermined code, to adjust a status of the label such that the passive resonant circuit does not emit the identification code when the passive resonant circuit is introduced into the first electromagnetic interrogation field. By, via the active circuit, sending a signal to the passive resonant circuit, the passive resonant circuit, according to the invention, can be selectively brought into a desired condition (active or inactive) and proceed to behave in a particular manner. Thus, the detection label can be adjusted to the needed functionality of the system, by switching the detectability off or on via the passive resonant circuit. According to the invention, this can even be done remotely, so that in the event of a system update, the detection labels can be adjusted to a new functionality. The invention can be implemented in different manners, so that the resonant circuit can be operative in different manners and, for example, may be wholly switched off, or only partly.

Some embodiments provide a detection label which is configured, in response to receiving the second interrogation field, when the second interrogation field comprises the second predetermined code, to adjust a status of the label such that the passive resonant circuit does not emit the identification code but does emit a carrier wave when the passive resonant circuit is introduced into the first electromagnetic interrogation field. In these embodiments, it is still detectable that a detection label is present, but no identification code or other information is transmitted. Only the returning carrier wave can be received. Another advantage is that in this mode the resonant circuit in the inactive condition yet does produce a resonance signal by virtue of which simple functions of the resonant circuit still remain available.

According to some embodiments, a detection label is provided which is configured, in response to receiving the second interrogation field, when the second interrogation field comprises the second predetermined code, to adjust a status of the label such that the passive resonant circuit emits nothing at all when the passive resonant circuit is introduced into the first electromagnetic interrogation field. This variant switches the passive resonant circuit of the detection label off entirely, so that it is not detectable at all anymore. This may for instance be achieved, according to some embodiments, in that a detection label is provided which is configured, in response to receiving the second interrogation field, when the second interrogation field comprises the second predetermined code, to adjust a status of the label such that the passive resonant circuit is short-circuited and as a result emits nothing at all when the passive resonant circuit is introduced into the first electromagnetic interrogation field. Short-circuiting of the passive resonant circuit can be implemented relatively simply with the aid of passive electronic components, such as transistors or a flip-flop circuit.

According to some embodiments, a detection label is provided in which the active circuit is provided with at least one sensor for obtaining information which, whether or not in processed form, is stored in the memory. For example, according to some embodiments, the invention provides a detection label in which the at least one sensor is at least one of: a motion sensor, sound sensor and temperature sensor. Such detection labels are used advantageously for watching livestock, for example livestock monitoring and health monitoring. The data can be collected over a longer period of time and then be sent to a central system when the detection label is in the proximity of a data communication network (for example, a Wi-Fi network or other network for data transfer).

According to some embodiments, a detection label is provided which is configured, in response to receiving the second interrogation field, when the second interrogation field comprises a third predetermined code, to adjust a status of the label such that the passive resonant circuit emits the identification code when the passive resonant circuit is introduced into the first electromagnetic interrogation field.

With these embodiments, the passive resonant circuit can further be switched on again, so that complete control over the detectability is obtained.

According to some embodiments, a detection label is provided which is configured, in response to receiving the second interrogation field when the second interrogation field comprises the third predetermined code, to adjust a status of the label such that the passive resonant circuit emits the identification code modulated on a carrier wave when the passive resonant circuit is introduced into the first electromagnetic interrogation field. The passive resonance circuit, in this embodiment, can emit the identification code on a desired frequency band.

According to some embodiments, a detection label is provided which is configured, in response to receiving the second interrogation field, when the second interrogation field comprises a third predetermined code, to adjust a status of the label such that the passive resonant circuit is no longer short-circuited and as a result emits the identification code when the passive resonant circuit is introduced into the first electromagnetic interrogation field. With these embodiments, the passive resonant circuit, after short-circuiting thereof, can also be switched on again, so that complete control over the detectability is obtained.

According to some embodiments, a detection label is provided in which the status of the label remains unchanged when an energy source for the active circuit is exhausted. An advantage of such an embodiment is that the detectability of the label does not depend on the battery status, and a previously set condition of the passive resonant circuit remains unaltered.

According to some embodiments, a detection label is provided in which the transmitter and the receiver each work on the UHF band. For example, according to some embodiments, a detection label is provided in which the resonant circuit works in the frequency range between 300 and 3000 megahertz (MHz), for example between 800 and 1000 MHz, in particular between 850 and 970 MHz. The invention, however, is not limited to these; other frequencies are also possible.

The invention will be discussed below on the basis of specific embodiments thereof not intended as limiting, with reference to the appended figures, in which.

Figure 1:
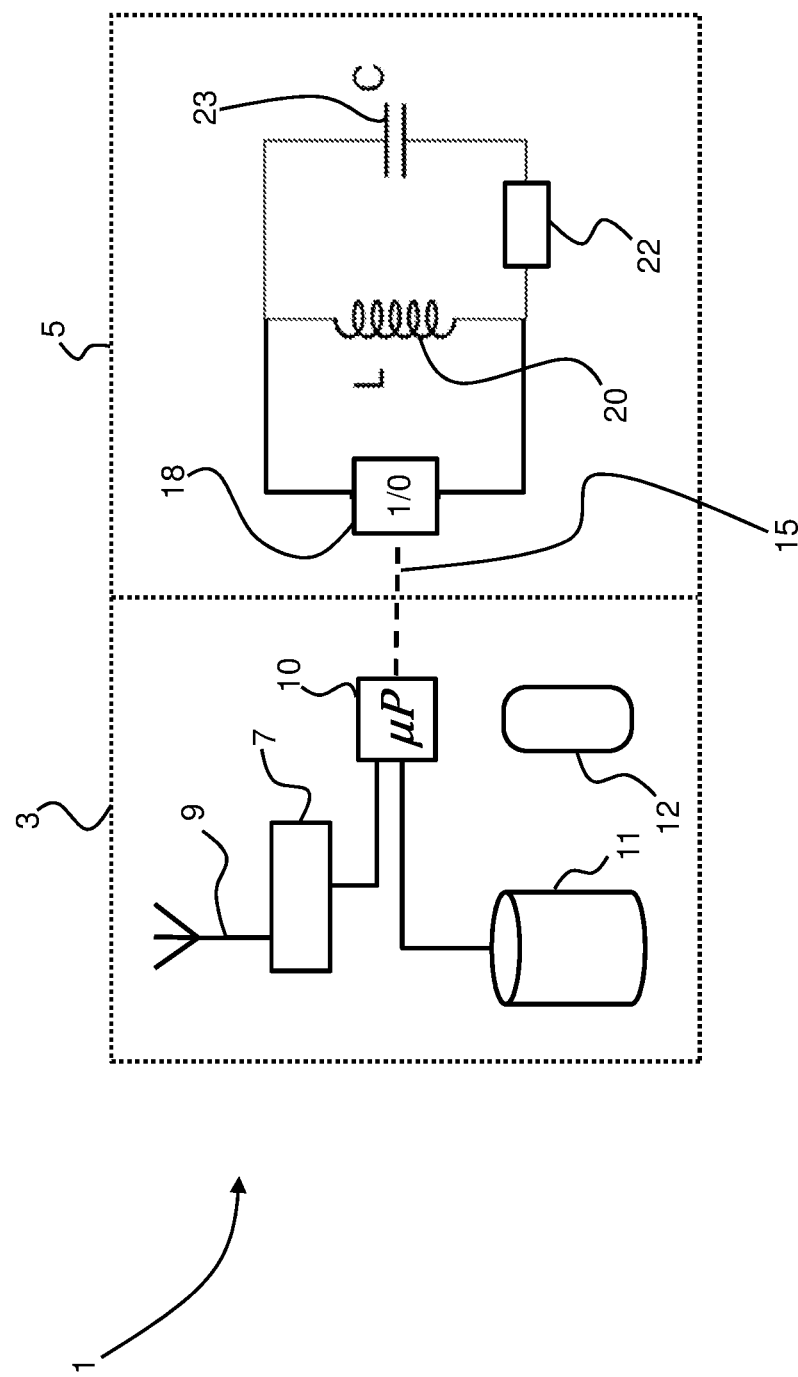
FIG. 1 is a schematic representation of a detection label according to an embodiment of the invention.

FIG. 1 is a schematic representation of a detection label 1 according to an embodiment of the present invention. The detection label 1 is provided with a passive resonant circuit 5 and an active circuit 3. The passive resonant circuit 5 consists of an LC circuit formed by the capacitor C, designated by reference numeral 23, and induction coil L connected in parallel thereto, designated with reference numeral 20. When the LC circuit is introduced into an interrogation field and via the circuit receives an interrogation signal having a characteristic frequency which is sufficiently equal to the resonance frequency of the LC circuit, this signal will resonate in the circuit. The circuit further comprises a modulation circuit 22 with which the resonance signal in the circuit can be modulated so that the signal of the LC circuit is uniquely distinguished from that of other detection labels. In this way, the signal of the passive resonant circuit is usable as identification signal, and the circuit can be applied for identifying animals when the circuit is built into a tag, such as an ear tag or a collar of a cow.

The detection label 1 further includes an active circuit 3, which constitutes the smart tag part of the detection label. This circuit includes a microprocessor (µP) 10, and is supplied by a battery 12. The circuit 3 further includes a transmitter and receiver unit 7 which is connected with antenna 9. The transmitter and receiver unit 7 may be configured, for example, to transmit and receive in the UHF (ultra high frequency) band. In the active circuit 3, data can be stored in memory 11. The active circuit 3 may be configured, for example, to receive data signals from one or more sensors (not shown) which can then be stored in the memory 11 and be periodically sent to a central server via a wireless network. Also, such data can be used internally in the active circuit 3 for executing particular functions, such as the monitoring of the state of health of the animal.

According to the invention, the active circuit 3 is configured for, via connection 15, selectively activating and deactivating the passive resonant circuit. Via the connection 15, the microprocessor 10, to that end, can control a circuit 18 with which the resonant circuit can be switched on and switched off. The connection 15 can be a wired connection, but it is also possible that the connection 15 is a wireless connection with the passive resonant circuit 5. Activation and deactivation may be implemented in different manners, and in FIGS. 2, 3 and 4 a few embodiments are schematically worked out. Furthermore, the detection label is preferably configured such that in case of insufficient power of the battery 12, the circuit 18 remains in the position set last. The circuit 18 hence remembers its last state.

Figure 2:
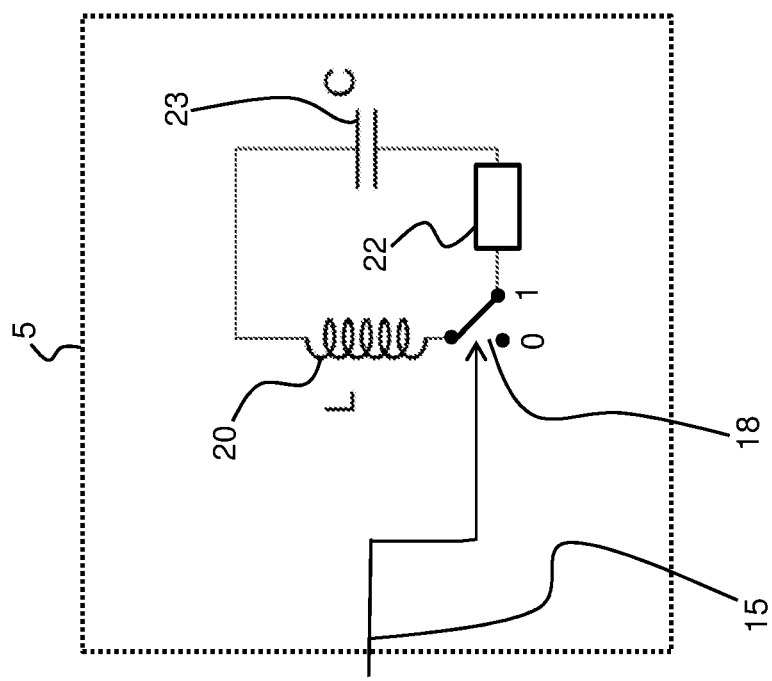
FIG. 2 is a schematic representation of a passive resonant circuit for use in an embodiment of the invention.

FIG. 2 shows an alternative embodiment of the passive resonant circuit 5 in a detection label 1 according to the invention. In this embodiment, via the connection 15, a bistable switch 18 can be operated which has at least two positions: active ("1") and inactive ("0"). In the active position, the switch 18 closes the LC circuit via the modulation circuit 22, and the LC circuit will be responsive to the reception of a suitable interrogation signal. Upon reception of such a signal, a modulated signal will be generated with the fundamental frequency as carrier wave frequency, and modulated by modulation circuit 22 for generating a unique detection signal. When via the connection 15 the switch is set to inactive, the LC circuit is interrupted, and no resonance signal is generated upon reception of an interrogation signal.

Figure 3:
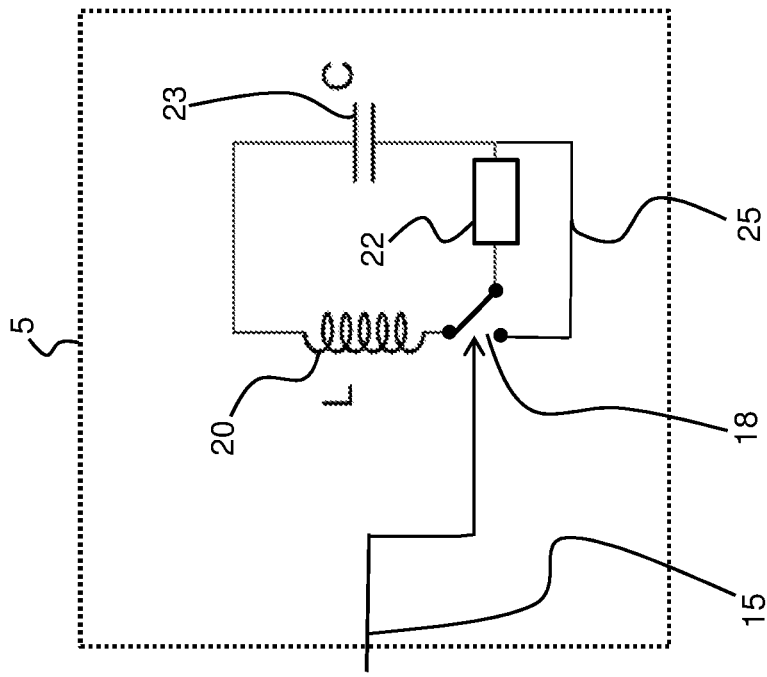
FIG. 3 is a schematic representation of a passive resonant circuit for use in an embodiment of the invention.

FIG. 3 shows an alternative embodiment of the passive resonant circuit 5. This circuit differs from that of FIG. 2 in the sense that the circuit 3 in FIG. 3, in the inactive position of switch 18, does not interrupt the LC circuit. Instead, the circuit is closed without including therein the modulation circuit. The passive resonant circuit 5 in that case does emit a resonance signal with the fundamental frequency as carrier wave, but this signal has not been modulated by modulation circuit 22 and is therefore not uniquely distinguishable. In the active position of the switch 18, the passive circuit works in the same way as the circuit in FIG. 2.

Figure 4:
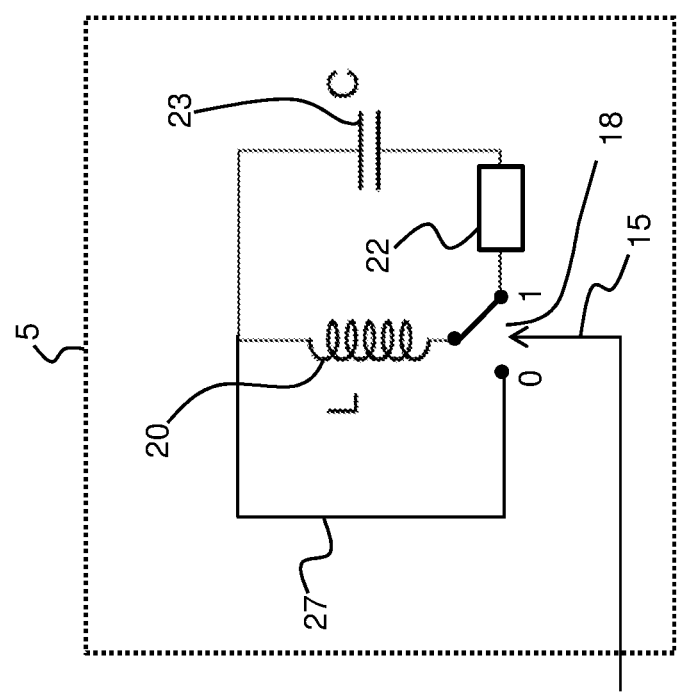
FIG. 4 is a schematic representation of a passive resonant circuit for use in an embodiment of the invention.

In FIG. 4, an alternative embodiment is shown, in which the passive resonant circuit 5, in the inactive position of switch 18, short-circuits the LC circuit via the induction coil 20. The effect of this is that the circuit does not respond to the reception of an interrogation signal, and hence no resonance signal is generated.

Other embodiments of the passive resonant circuit are furthermore provided with a simple chip included in the LC circuit, which chip, depending on a received command signal, activates or inactivates a particular part of the circuit. The skilled person will understand that the invention, according to the present invention, can be implemented in different manners.

The above-described specific embodiments of the invention are intended to illustrate the principle of the invention. The invention is only limited by the following claims.

The invention claimed is:

1. A detection label comprising:
a passive resonant circuit that, while having a status in a first state, is configured to emit an identification code responsive to the passive resonant circuit being introduced into a first electromagnetic interrogation field;
a memory; and
an active circuit comprising a transmitter and a receiver,
wherein the active circuit is configured to emit information stored in the memory with the transmitter responsive to the active circuit being introduced into a second electromagnetic interrogation field comprising a first predetermined code,
wherein the second electromagnetic interrogation field is received by the label using the receiver,
wherein the label is configured, in response to receiving the second interrogation field and the second interrogation field comprising a second predetermined code, to control the passive resonant circuit to adjust the status of the label to a second state such that the passive resonant circuit does not emit the identification code responsive to the passive resonant circuit being introduced into the first electromagnetic interrogation field.

2. The detection label according to claim 1, wherein the label is configured, in response to receiving the second interrogation field and the second interrogation field comprising a second predetermined code, to adjust a status of the label to a second state such that the passive resonant circuit emits a carrier wave responsive to the passive resonant circuit being introduced into the first electromagnetic interrogation field.

3. The detection label according to claim 1, wherein the label is configured, in response to receiving the second interrogation field and the second interrogation field comprising a second predetermined code, to adjust a status of the label to a second state such that the passive resonant circuit is disabled from transmitting such that the passive resonant circuit emits nothing at all when the passive resonant circuit is introduced into the first electromagnetic interrogation field.

4. The detection label according to claim 3, wherein the label is configured, in response to receiving the second interrogation field and the second interrogation field comprising a second predetermined code, to adjust a status of the label to a second state wherein the passive resonant circuit is short-circuited and as a result emits nothing at all when the passive resonant circuit is introduced into the first electromagnetic interrogation field.

5. The detection label according to claim 4, wherein the label is configured, in response to receiving the second interrogation field and the second interrogation field comprising a third predetermined code, to adjust the status of the label to further state such that the passive resonant circuit is no longer short-circuited and as a result emits the identification code responsive to the passive resonant circuit being introduced into the first electromagnetic interrogation field.

6. The detection label according to claim 1, wherein the active circuit includes at least one sensor for obtaining information that, whether or not in processed form, is stored in the memory.

7. The detection label according to claim 6, wherein the at least one sensor is at least one of a sensor type taken from the group consisting of: a motion sensor, a sound sensor and a temperature sensor.

8. The detection label according to claim 1, wherein the label is configured, in response to receiving the second interrogation field and the second interrogation field comprising a third predetermined code, to adjust a status of the label to a third state such that the passive resonant circuit emits the identification code responsive to the passive resonant circuit being introduced into the first electromagnetic interrogation field.

9. The detection label according to claim 1, wherein the label is configured, in response to receiving the second interrogation field and the second interrogation field comprising a third predetermined code, to adjust a status of the label to a third state such that the passive resonant circuit emits the identification code modulated on a carrier wave responsive to the passive resonant circuit being introduced into the first electromagnetic interrogation field.

10. The detection label according to claim 1 wherein the status of the label remains unchanged in accordance with an energy source for the active circuit being exhausted.

11. The detection label according to claim 1 wherein the transmitter and the receiver each work on the ultra-high frequency (UHF) band.

12. The detection label according to claim 1, wherein the resonant circuit is operative in the frequency range between 300 and 3000 megahertz (MHz).

* * * * *